(12) United States Patent
Chatterjee (10) Patent No.: US 9,955,204 B2
(45) Date of Patent: Apr. 24, 2018

(54) SYSTEM AND METHOD FOR DISTRIBUTING CONTENT THROUGH A SET-TOP BOX

(71) Applicant: CenturyLink Intellectual Property LLC, Denver, CO (US)

(72) Inventor: Koushik Chatterjee, Orlando, FL (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 13/787,371

(22) Filed: Mar. 6, 2013

(65) Prior Publication Data

US 2014/0259081 A1 Sep. 11, 2014

(51) Int. Cl.
*H04N 21/41* (2011.01)
*H04N 21/436* (2011.01)

(52) U.S. Cl.
CPC ..... *H04N 21/4126* (2013.01); *H04N 21/4122* (2013.01); *H04N 21/43615* (2013.01)

(58) Field of Classification Search
CPC .... H04N 21/41; H04N 21/436; H04N 21/472; H04N 21/437; H04N 21/432; H04N 21/4358; H04N 21/4126; H04N 21/43615; H04N 21/4122; H04N 21/23424; H04N 21/4316; H04N 21/458; G06Q 30/024; G06Q 30/0251
USPC ...................................... 725/74, 82, 24, 110
See application file for complete search history.

(56) References Cited

U.S. PATENT DOCUMENTS 5,831,664 A * 11/1998 Wharton et al. ................ 725/81
5,872,588 A 2/1999 Aras et al.
6,532,589 B1 3/2003 Proehl et al.
6,684,240 B1 1/2004 Goddard
6,810,526 B1 10/2004 Menard et al.
7,478,414 B1 1/2009 Glusker et al.
7,571,458 B1 8/2009 Eyal
7,640,570 B2 12/2009 Wagner et al.
7,643,564 B2 1/2010 Sheynman
7,870,279 B2 1/2011 Chuang et al.
7,882,528 B1 2/2011 Taylor et al.
8,253,558 B2 8/2012 Emerson et al.
(Continued)

FOREIGN PATENT DOCUMENTS

EP 1650927 A2 4/2006

OTHER PUBLICATIONS

Parchomovsky, Gideon et al., "Fair Use Harbors"; 93 Va. L. Rev. 1483 (2007).
(Continued)

*Primary Examiner* — Benjamin R Bruckart
*Assistant Examiner* — Tien M Nguyen
(74) *Attorney, Agent, or Firm* — Swanson & Bratschun, L.L.C.

(57) ABSTRACT

A system and method for distributing content through a set-top box. A number of wireless devices are registered for a communications session with the set-top box. Media content is communicated to one or more displays. Interactive content associated with the media content is retrieved for each of the number of wireless devices in response to receiving requests from each of the number of wireless devices. The interactive content is distributed to each of the number of wireless devices in response to retrieving the interactive content for each of the number of wireless devices.

20 Claims, 5 Drawing Sheets

(56) References Cited

U.S. PATENT DOCUMENTS

| | | | |
|---|---|---|---|
| 8,260,363 B2 | 9/2012 | Roberts et al. | |
| 8,286,215 B2 | 10/2012 | Daniels | |
| 8,312,500 B2 | 11/2012 | Emerson et al. | |
| 8,316,399 B1 | 11/2012 | Nush | |
| 8,467,275 B2 | 6/2013 | Emerson et al. | |
| 8,478,598 B2 | 7/2013 | Burckart et al. | |
| 8,584,189 B2 | 11/2013 | Emerson et al. | |
| 8,627,377 B2 | 1/2014 | LaFreniere et al. | |
| 8,627,399 B2 * | 1/2014 | White et al. | 725/133 |
| 8,731,620 B2 | 5/2014 | Roberts et al. | |
| 8,756,646 B2 | 6/2014 | LaFreniere et al. | |
| 8,789,113 B2 | 7/2014 | Goergen et al. | |
| 8,856,855 B2 | 10/2014 | Goergen et al. | |
| 9,106,976 B2 | 8/2015 | Emerson et al. | |
| 9,167,206 B2 | 10/2015 | Goergen et al. | |
| 9,215,419 B2 | 12/2015 | Rondeau et al. | |
| 9,300,993 B2 | 3/2016 | Goergen et al. | |
| 9,460,611 B2 | 10/2016 | Emerson et al. | |
| 9,866,917 B2 | 1/2018 | Goergen et al. | |
| 9,872,078 B2 | 1/2018 | Goergen et al. | |
| 2001/0021994 A1 | 9/2001 | Nash | |
| 2002/0054062 A1 | 5/2002 | Gerba et al. | |
| 2002/0083468 A1 | 6/2002 | Dudkiewicz | |
| 2002/0100044 A1 | 7/2002 | Daniels | |
| 2002/0124252 A1 | 9/2002 | Schaefer et al. | |
| 2002/0129368 A1 | 9/2002 | Schlack et al. | |
| 2002/0147986 A1 | 10/2002 | Michael et al. | |
| 2002/0178451 A1 | 11/2002 | Ficco | |
| 2002/0184631 A1 | 12/2002 | Cezeaux et al. | |
| 2002/0188944 A1 | 12/2002 | Noble | |
| 2002/0188949 A1 | 12/2002 | Wang et al. | |
| 2002/0188959 A1 * | 12/2002 | Piotrowski | 725/112 |
| 2003/0005448 A1 | 1/2003 | Axelsson et al. | |
| 2003/0018977 A1 | 1/2003 | McKenna | |
| 2003/0066069 A1 | 4/2003 | Mankovich | |
| 2003/0128114 A1 | 7/2003 | Quigley | |
| 2003/0128820 A1 | 7/2003 | Hirschberg et al. | |
| 2003/0194966 A1 | 10/2003 | Fellenstein et al. | |
| 2003/0208777 A1 | 11/2003 | Danker et al. | |
| 2004/0019807 A1 | 1/2004 | Freund | |
| 2004/0049785 A1 | 3/2004 | Grzeczkowski et al. | |
| 2004/0073915 A1 | 4/2004 | Dureau | |
| 2004/0203651 A1 | 10/2004 | Qu et al. | |
| 2005/0091683 A1 | 4/2005 | Sheynman et al. | |
| 2005/0149987 A1 | 7/2005 | Boccon-Gibod et al. | |
| 2005/0204388 A1 | 9/2005 | Knudson et al. | |
| 2005/0207542 A1 | 9/2005 | Carroll et al. | |
| 2006/0020993 A1 | 1/2006 | Hannum et al. | |
| 2006/0087428 A1 | 4/2006 | Wolfe et al. | |
| 2006/0107297 A1 | 5/2006 | Toyama et al. | |
| 2006/0123053 A1 | 6/2006 | Scannell, Jr. | |
| 2006/0127038 A1 | 6/2006 | Kwon | |
| 2006/0184989 A1 | 8/2006 | Slothouber | |
| 2006/0212894 A1 | 9/2006 | Knudson et al. | |
| 2006/0253886 A1 | 11/2006 | Khurana et al. | |
| 2006/0294564 A1 | 12/2006 | Guillorit | |
| 2007/0079345 A1 | 4/2007 | McEnroe | |
| 2007/0079353 A1 | 4/2007 | Boortz | |
| 2007/0104456 A1 | 5/2007 | Craner | |
| 2007/0121651 A1 | 5/2007 | Casey et al. | |
| 2007/0150273 A1 | 6/2007 | Yamamoto et al. | |
| 2007/0154163 A1 | 7/2007 | Cordray | |
| 2007/0204288 A1 | 8/2007 | Candelore | |
| 2007/0220554 A1 | 9/2007 | Barton et al. | |
| 2007/0280445 A1 | 12/2007 | Shkedi | |
| 2007/0280446 A1 | 12/2007 | Hsieh et al. | |
| 2007/0287498 A1 | 12/2007 | Wang et al. | |
| 2007/0294180 A1 | 12/2007 | Bucher et al. | |
| 2007/0300269 A1 | 12/2007 | Roberts et al. | |
| 2008/0026694 A1 | 1/2008 | Ramanathan et al. | |
| 2008/0059992 A1 | 3/2008 | Amidon et al. | |
| 2008/0107244 A1 | 5/2008 | Setzer et al. | |
| 2008/0115164 A1 | 5/2008 | Kiiskinen | |
| 2008/0134043 A1 | 6/2008 | Georgis et al. | |
| 2008/0228733 A1 | 9/2008 | Davis et al. | |
| 2008/0282290 A1 * | 11/2008 | Malik | G06Q 30/0251 725/42 |
| 2008/0301732 A1 | 12/2008 | Archer et al. | |
| 2009/0052870 A1 | 2/2009 | Marsh et al. | |
| 2009/0069038 A1 | 3/2009 | Olague et al. | |
| 2009/0089844 A1 | 4/2009 | Beyabani | |
| 2009/0133069 A1 | 5/2009 | Conness et al. | |
| 2009/0133070 A1 | 5/2009 | Hamano et al. | |
| 2009/0150925 A1 | 6/2009 | Henderson | |
| 2009/0158325 A1 | 6/2009 | Johnson | |
| 2009/0158382 A1 | 6/2009 | Shaffer et al. | |
| 2009/0164559 A1 | 6/2009 | Johnson et al. | |
| 2009/0217324 A1 | 8/2009 | Massimi | |
| 2009/0217332 A1 | 8/2009 | Hindle et al. | |
| 2009/0228929 A1 | 9/2009 | Cass | |
| 2009/0249387 A1 | 10/2009 | Magdy et al. | |
| 2009/0249451 A1 | 10/2009 | Su et al. | |
| 2009/0265737 A1 | 10/2009 | Issa et al. | |
| 2009/0276224 A1 | 11/2009 | Medina et al. | |
| 2009/0293079 A1 * | 11/2009 | McKee et al. | 725/10 |
| 2009/0300695 A1 | 12/2009 | White et al. | |
| 2010/0058395 A1 | 3/2010 | Goergen et al. | |
| 2010/0058415 A1 | 3/2010 | Goergen et al. | |
| 2010/0058416 A1 | 3/2010 | LaFreniere et al. | |
| 2010/0058417 A1 | 3/2010 | Rondeau et al. | |
| 2010/0064325 A1 | 3/2010 | Fishman et al. | |
| 2010/0125884 A1 * | 5/2010 | Howcroft | 725/93 |
| 2010/0169944 A1 | 7/2010 | Rondeau et al. | |
| 2010/0186038 A1 | 7/2010 | Thomas et al. | |
| 2010/0251325 A1 | 9/2010 | Gupta | |
| 2010/0261466 A1 * | 10/2010 | Chang et al. | 455/420 |
| 2011/0126251 A1 | 5/2011 | LaFreniere et al. | |
| 2011/0126257 A1 | 5/2011 | Goergen et al. | |
| 2011/0131604 A1 | 6/2011 | Van Hoff et al. | |
| 2011/0270952 A1 * | 11/2011 | Ray et al. | 709/218 |
| 2012/0018510 A1 | 1/2012 | Gardner | |
| 2012/0223134 A1 | 9/2012 | Smith et al. | |
| 2012/0223135 A1 | 9/2012 | Meek et al. | |
| 2012/0233638 A1 * | 9/2012 | Slaney et al. | 725/34 |
| 2012/0317599 A1 | 12/2012 | Emerson et al. | |
| 2012/0324003 A1 | 12/2012 | Armstrong et al. | |
| 2013/0031590 A1 * | 1/2013 | Ivanov et al. | 725/110 |
| 2013/0074109 A1 | 3/2013 | Skelton et al. | |
| 2013/0241726 A1 | 9/2013 | Hunter et al. | |
| 2013/0305275 A1 | 11/2013 | Emerson et al. | |
| 2014/0053190 A1 * | 2/2014 | Sirpal | 725/37 |
| 2014/0066003 A1 | 3/2014 | Emerson et al. | |
| 2014/0074621 A1 * | 3/2014 | Chai et al. | 705/14.66 |
| 2014/0130093 A1 | 5/2014 | Goergen et al. | |
| 2014/0282705 A1 | 9/2014 | Chatterjee et al. | |
| 2015/0296261 A1 | 10/2015 | Emerson et al. | |
| 2016/0029062 A1 | 1/2016 | Rondeau et al. | |
| 2016/0165317 A1 | 6/2016 | Goergen et al. | |

OTHER PUBLICATIONS

U.S. Appl. No. 12/201,249; Notice of Allowance dated Mar. 14, 2014; 31 pages.

U.S. Appl. No. 12/201,313; NonFinal Office Action dated Mar. 26, 2014; 10 pages.

U.S. Appl. No. 12/201,313; Final Office Action dated Oct. 23, 2014; 11 pages.

U.S. Appl. No. 12/201,313; Final Office Action dated Feb. 27, 2015; 11 pages.

U.S. Appl. No. 14/152,696; Notice of Publication dated May 8, 2014; 1 page.

U.S. Appl. No. 12/201,273; NonFinal Office Action dated Apr. 10, 2014; 35 pages.

U.S. Appl. No. 12/201,273; Final Office Action dated Oct. 27, 2014; 38 pages.

U.S. Appl. No. 12/201,273; Notice of Allowance dated Mar. 16, 2015; 28 pages.

U.S. Appl. No. 12/201,436; Final Office Action dated Apr. 25, 2014; 30 pages.

U.S. Appl. No. 13/750,537; Notice of Allowance dated Jan. 10, 2014; 11 pages.

(56) References Cited

OTHER PUBLICATIONS

U.S. Appl. No. 12/347,414; Final Office Action dated Feb. 3, 2014; 16 pages.
U.S. Appl. No. 12/347,414; NonFinal Office Action dated Sep. 11, 2014; 17 pages.
U.S. Appl. No. 12/347,414; Final Office Action dated Feb. 3, 2015; 17 pages.
U.S. Appl. No. 13/910,706; Notice of Allowance dated Mar. 26, 2015; 30 pages.
U.S. Appl. No. 13/567,367; NonFinal Office Action dated Jan. 30, 2014; 17 pages.
U.S. Appl. No. 13/567,367; Final Office Action dated Jul. 23, 2014; 14 pages.
U.S. Appl. No. 12/625,744; Notice of Allowance dated Feb. 5, 2014; 26 pages.
U.S. Appl. No. 12/625,762; Notice of Allowance dated Jun. 3, 2014; 18 pages.
U.S. Appl. No. 13/962,531; Notice of Publication dated Sep. 19, 2014; 1 page.
U.S. Appl. No. 13/962,531; NonFinal Office Action dated Dec. 18, 2014; 47 pages.
U.S. Appl. No. 14/152,696; NonFinal Office Action dated Aug. 21, 2015; 26 pages.
U.S. Appl. No. 12/201,313; NonFinal Office Action dated Jul. 1, 2015; 19 pages.
U.S. Appl. No. 12/347,414; Notice of Allowance dated Jul. 7, 2015; 20 pages.
U.S. Appl. No. 13/567,367; NonFinal Office Action dated Jun. 10, 2015; 21 pages.
U.S. Appl. No. 13/962,531; Final Office Action dated Jun. 19, 2015; 30 pages.
U.S. Appl. No. 14/152,696; Final Office Action dated Jan. 21, 2016; 23 pages.
U.S. Appl. No. 12/201,313; Notice of Allowance dated Nov. 10, 2015; 13 pages.
U.S. Appl. No. 13/567,367; NonFinal Office Action dated Dec. 16, 2015; 17 pages.
U.S. Appl. No. 13/962,531; NonFinal Office Action dated Nov. 4, 2015; 36 pages.
U.S. Appl. No. 14/152,696; NonFinal Office Action dated Jul. 1, 2016; 50 pages.
U.S. Appl. No. 13/567,367; Notice of Allowance dated Jun. 10, 2016; 13 pages.
U.S. Appl. No. 13/962,531; Final Office Action dated Apr. 14, 2016; 34 pages.
U.S. Appl. No. 14/747,843; NonFinal Office Action dated Apr. 6, 2016; 30 pages.
U.S. Appl. No. 14/747,843; Final Office Action dated Jul. 14, 2016; 34 pages.
U.S. Appl. No. 14/878,226; NonFinal Office Action dated Jun. 15, 2016; 22 pages.
U.S. Appl. No. 14/152,696; Final Office Action dated Oct. 6, 2016; 51 pages.
U.S. Appl. No. 13/962,531; NonFinal Office Action dated Aug. 2, 2016; 35 pages.
U.S. Appl. No. 15/040,865; NonFinal Office Action dated Oct. 6, 2016; 51 pages.
U.S. Appl. No. 13/962,531; Final Office Action dated Jan. 31, 2017; 41 pages.
U.S. Appl. No. 14/747,843; NonFinal Office Action dated Dec. 27, 2016; 26 pages.
U.S. Appl. No. 14/878,226; Final Office Action dated Nov. 30, 2016; 13 pages.
U.S. Appl. No. 14/878,226; NonFinal Office Action dated Mar. 22, 2017; 13 pages.
U.S. Appl. No. 15/040,865; Final Office Action dated Apr. 6, 2017; 30 pages.
U.S. Appl. No. 14/152,696; NonFinal Office Action dated May 1, 2017; 27 pages.
U.S. Appl. No. 13/962,531; NonFinal Office Action dated Jul. 26, 2017; 44 pgs.
U.S. Appl. No. 14/747,843; Final Office Action dated Jun. 14, 2017; 40 pages.
U.S. Appl. No. 14/878,226; Final Office Action dated Aug. 29, 2017; 14 pages.
U.S. Appl. No. 15/040,865; Notice of Allowance dated Oct. 2, 2017; 37 pages.

\* cited by examiner

SYSTEM AND METHOD FOR DISTRIBUTING CONTENT THROUGH A SET-TOP BOX

BACKGROUND

The use of and development of communications has grown nearly exponentially in recent years. The growth is fueled by larger networks with more reliable protocols and better communications hardware available to service providers and consumers. In particular, many users receive satellite, cable, Internet Protocol television (IPTV), and other media services for display on one or more televisions within a home, business, or organization.

Many users have one or more set-top boxes, digital video recorders (DVR), personal video recorders (PVR), media devices, streaming devices, or home network devices in their home, business, or organization. In many cases, the functionality of these network devices may be limited to very narrow applications. Users have come to expect services that are more intuitive and integrated with their day-to-day lives. As a result, additional features and services have not kept pace with user expectations.

SUMMARY

One embodiment provides a system and method for distributing content through a set-top box. A number of wireless devices may be registered for a communications session. Media content may be communicated to one or more displays. Interactive content associated with the media content may be retrieved for each of the number of wireless devices in response to receiving requests from each of the number of wireless devices. The interactive content may be distributed to each of the number of wireless devices in response to retrieving the interactive content for each of the number of wireless devices.

Another embodiment provides a set-top box. The set-top box may include a processor configured to execute a set of instructions and a memory configured to store the set of instructions. The set of instructions may be executed to register a number of wireless devices for a communication session, communicate media content to one or more displays, retrieve interactive content associated with the media content for each of the number of wireless devices in response to receiving requests from each of the number of wireless devices, and distribute the interactive content to each of the number of wireless devices in response to retrieving the interactive content for each of the number of wireless devices.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments provide a system and method for distributing content through a set-top box. In one embodiment, the set-top box is an electronic device configured to process an incoming media signal or communication for display by a television, monitor, or other similar device. The content may include data, files, information, instructions, video, music, advertisements, websites, links, or other distributable content. The set-top box may be configured to connect to multiple computing or communications devices, such as smart phones, tablets, or enhanced accessories. For example, the set-top box may communicate with a number of devices utilizing wireless standards or protocols, such as Wi-Fi, Bluetooth, near field communications, WiMAX, or so forth. The set-top box may receive content through a cable, power line, satellite, phone line, Internet, or other communication connection. In one embodiment, the set-top box is a computing device providing two-way communications on an IP network and decoding the received video stream.

The interactive content may be pre-linked with the media content. For example, references to products or services, relevant clothes, or other interactive content may be associated with media content that is distributable to each user. The interactive content may be managed by the content provider, such as the communication service provider, network station, media group or enterprise, or channel provider.

In one embodiment, one or more users may select to receive the interactive content based on the media content being communicated to or displayed by a display in communication with the set-top box. For example, the user may retrieve advertising information, media schedules, different camera angles, replays, informational details, dictionary references, or so forth based on a media program being viewed by one or more users.

Figure 1:
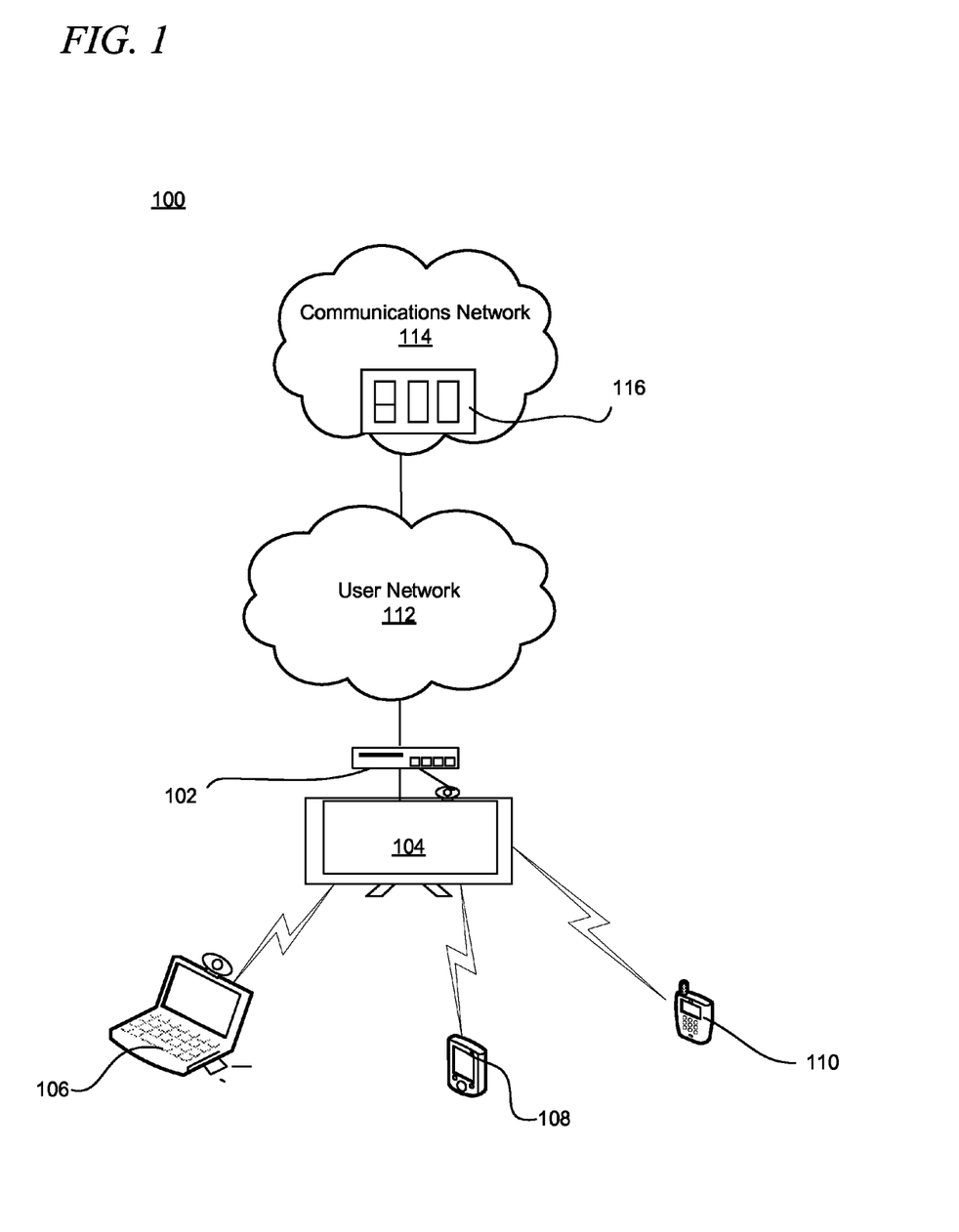
FIG. 1 is a pictorial representation of a communications environment in accordance with an illustrative embodiment.

As a result, each user's individual experience may be customized and unique for the media content being viewed. The individual satisfaction with the viewing and interaction experience may be enhanced with greater user satisfaction and marketability of media services and programming. In one embodiment, programmers working with media content providers may have access to a number of variables. For example, the programmers may be presented with data points representing what is being viewed or requested on the mobile device even if the media content is paused. The content may be identified utilizing any number of associated titles, numbers, frame numbers, scenes, or so forth. The programmer may also be presented with information identifying the content on each device, such as the wireless devices 106-110 connected to the set-top box 102. The Mac address of the electronic devices connected to the set-top box 102 may also be available for customizing communications as needed. The programmers may also be presented with screen capture information from data of what is being streamed to the wireless devices 106-110 and what inputs/changes are being made on each of the wireless devices 106-110.

In one embodiment, the users may be allowed to display the selected interactive content to the one or more displays in response to a user selection and user preferences indicating whether such sharing is allowed.

FIG. 1 is a pictorial representation of a communications environment 100 in accordance with an illustrative embodiment. The different components, systems, devices, and equipment of the communications environment 100 may be configured to communicate and distribute media content to a number of electronic devices as selected by one or more users. In one embodiment, the communications environment 100 may include a set-top box 102, a television 104, wireless devices 106, 108, and 110, user network 112, communications network 114, and communications management system 116.

Communications within the communications environment 100 may occur on any number of networks which may include wireless networks, data or packet networks, cable networks, satellite networks, Internet protocol television (IPTV) networks, private networks, public networks, cloud networks, or other types of communications networks. The communications network 114 is infrastructure including systems, equipment, devices, and software for sending and receiving media content and signals according to one or more designated formats, standards, and protocols. The communications network 114 may represent a single communication service provider or multiple communications service providers. For example, the communications network 114 may represent a cloud network that may be updated and accessed from innumerable locations, points, devices, networks, and systems.

In one embodiment, the features, services, and processes of the illustrative embodiments may be implemented by one or more components of the communications environment 100 independently or as a networked implementation. The communications network 114 may include various fiber optics, cables, transmission towers, antennas, adapters, routers, servers, or other components for transmitting and receiving media, data, and voice communications to the user network 112. The media content may be communicated within the communications environment 100 as data, packets, or other types of analog and digital signals.

In one embodiment, the user network 112 represents the wired or wireless communications an devices operated by a user. Communications between the communications network 114 and the user network 112 may occur utilizing wireless communications, such as satellite connections, Wi-Fi, WiMAX, code division multiple access (CDMA), and/or hardwired connections, such as fiber optics, T1, cable, DSL, high speed trunks, and telephone lines.

In one embodiment, the communications management system 116 is one or more network devices utilized to enable, initiate, route, and manage media content and other communications between one or more networks, connections, or communications devices. The communications management system 116 may include one, or more devices networked to manage the communications network 114. For example, the communications management system 116 may include any number of servers, routers, switches, or advanced intelligent devices. The communications network 116 sends and receives the electronic signals through any number of transmission mediums. The communications network 114 and the communications management system 116 may include IPTV systems and software.

The communications network 114 may include any number of servers, databases, and other systems for delivering content to the wireless devices 106-110. The one embodiment, browsers or applications of the wireless devices 106-110 may be utilized to retrieve content through the set-top box 102. For example, a mobile application may allow the wireless devices 106-110 to interact with the set-top box 102. In one embodiment, the set-top box 102 may utilize a scripting language, such as Javascript, HTML5, actionscript, or other similar languages to react to the selections made utilizing the wireless devices 106-110. In one embodiment, the bandwidth available to the set-top box 102 may be increased in response to a subscription to receive interactive content, registration of each of the wireless devices 106-110, or other conditions. The content may be delivered as text, email, or chat messages, pop-ups, windows, alerts, webpages, or other graphical, audio, or tactile communications to the users.

In one embodiment, the set-top box 102 is configured to establish a server client relationship with each of the wireless devices 106-110. The set-top box 102 may also function as a media server and enhanced IPTV gateway for each of the wireless devices 106-110. For example, the set-top box 102 may provide multiple interactive client streams to the wireless devices 106-110. In one embodiment, each of the wireless devices 106-110 may be associated with the set-top box 102. For example, identifiers of each of the wireless devices 106-110 may be registered, linked, or associated with the set-top box 102. In one embodiment, an IMEI, Mac address, phone number, email address, username, or so forth may be registered with the set-top box 102. In one embodiment, the set-top box 102 may communicate on one or more channels or networks designated for communication with the wireless devices 106-110. As a result, the wireless devices 106-110 and the associated with the set-top box 102 in response to setting up wireless communications with the set-top box 102 (e.g. setting an SSID, username, device identification, etc.) In one embodiment, the set-top box 102 may act as a repeater, extender, booster, or router.

The set-top box 102 may communicate with wireless devices 106-110 utilizing any number of wired or wireless standards or protocols. For example, the set-top box 102 may communicate with the wireless devices 106-110 utilizing Wi-Fi, Bluetooth, a cellular data signals (e.g. TDMA, CDMA, GSM, PCS, WLAN, GSMR, etc.) save it to sleep, near field communications, WiMAX, or other similar or developing standards. The number of wireless devices 106-110 may vary between one and ten devices at any given time. However, any number of devices may communicate with the set-top box 102 at once without limitation.

In one embodiment, the set-top box 102 may include logic configured to implement the processes as are herein described. The logic may include motherboards, chipsets, ASICs, FPGAs, or other digital logic. In another embodiment, the logic may include algorithms, programs, scripts, applications, kernels, or other software instructions suitable for implementing the processes as described. The set-top box 102 may be configured to partition the display of the television 104 for the media content as well as content that may be selected from each of the wireless devices 106-110.

In one embodiment, the set-top box 102 may duplicate the content being streamed to the television 104 for each of the wireless devices 106-110. For example, the media content may be duplicated on each of the wireless devices 106-110. In one embodiment, the wireless devices 106-110 may be utilized to draw or highlight or mark the media content. For example, the user may utilize a finger or stylus to make drawings or notes, or a keyboard of voice recognition to insert comments in text, audible, video, or image form. The user generated content may be integrated with or displayed over the media content and shared with the television 104 on the main screen, as a picture in picture window, or other segmentation. The content generated on one of the wireless devices 106-110 may also be shared with the other wireless devices 106-110. For example, the users of the wireless devices 106-110 may note funny portions of the displayed content. The users may also write or type answers to questions during a game show to interactively play against the other users. In one embodiment, each user of the wireless devices 106-110 may view the content being seen by the other users by performing a swipe (e.g. left to right, top to bottom, etc.) to move between screens. Any number of compression schemes or communications standards and protocols may be utilized within the communications environment 100 to ensure compatibility.

In one embodiment, the content provider may grant a license for all users that are connected to the set-top box 102. However, the content provider may set limits for the number of wireless devices 106-110 or amount of time that the wireless devices 106-110 may interact with media content (e.g. by episode, series, day, week, month, year, etc.). In one embodiment, the user may grant access for other remote users (e.g. communications service providers, television stations, hosts, individual users, etc.) to view the user generated content or utilize it as well.

In one embodiment, each of the users may select an avatar or picture for associate with comments or content that the user generates utilizing the wireless devices 106-110. The set-top box 102 may also capture images of the users utilizing a camera integrated or attached to the set-top box 102, television 104, or wireless devices 106-110 to integrate live images of the users. For example, the images of the users may be filtered and inserted into game shows, comedies, skits, or so forth. Green screen or default images may be utilized to retrieve the user's entire surroundings or just the user. For example, user faces may be retrieved and inserted onto the faces of individuals that are utilized within media content (e.g. a television comedy). The backgrounds may then be applied by the set-top box 102. For example, users may be paired in teams to play against each other.

The user may select portions of the media content to receive additional information. In one embodiment, user selections may be received interactively. For example, the media content may be divided into grids, sections, or portions associated with interactive content that may be sent to the users, and by selecting a particular portion of the screen on one of the wireless devices 106-110, the interactive content associated with that grid may be displayed. The illustrative embodiments may be particularly useful for touchscreens. For example, users may select images displayed by the media content to receive associated information. As previously described, before being streamed all or portions of the media content may be associated with interactive content that may be retrieved by the wireless devices 106-110 during a communication session with the set-top box 102. In one embodiment, any of the communications herein described may require a communication session be initiated and authorized between any and all of the wireless devices 106-110, the set-top box 102, the television 104, and any other smart devices in the communications environment 100.

User selections may also be received through voice commands and relate to the types of available interactive content (e.g. What types of clothes are those? Where can I buy that product? Where are they at? How much does that cost? Show me more information. Show me the bloopers. Who was the director? Is there an alternative ending? What does that mean? Explain that. Show the replay. Change the camera angle. What is everyone saying about that on Twitter and Facebook?) The voice commands may be received through the individual wireless devices 106-110 or through the television 104, set-top box 102, or other integrated devices, such as webcams, microphones, gaming systems, controllers, remote controls, or so forth. For example, during advertisements, a user may select a product to view more information, such as cost, availability, functionality, or so forth.

In one embodiment, the wireless devices 106-110 may not display the media content, but may instead display the available interactive content as it changes during the broadcast. For example, the available interactive content may be selected utilizing buttons, icons, images, text, links, or other selection elements related to the media content communicated to the set-top box 102. As a result, the communications environment 100 provides the opportunity for the user to customize their viewing an interactive experience based on the media content being displayed to users. For example, during the Super Bowl any number of users that are excited, lukewarm, or not excited about the gain may be watching utilizing the set-top box 102 and the television 104, football enthusiasts may be allowed to select interactive content, such as statistics, camera angle changes, replace, player profiles, social networking messages or posts, or so forth, while those individuals that are not interested in football may be allowed to replay commercials, the use of the channel or program schedule, and determine how much time is left in the game, lookup recipes relevant to products displayed during the commercials, view close prices, styles, and availability of reporters at the Super Bowl, and so forth.

In one embodiment, each of the wireless devices 106-110 may have a distinct interactive communications session with the set-top box 102. However, based on the user preferences for each of the wireless devices 106-110 and the set-top box 102, the interactive communications sessions with each of the wireless devices 106-110 may be linked or available to each of the other wireless devices 106-110. As a result, the users may quickly see what the others are viewing when verbally or electronically prompted. The sessions may also be linked for convenience, parental control, or so forth. In one embodiment, the wireless device 106 may display interactive content selected by the user of the wireless device 106 as well as the interactive sessions of wireless devices 108 and 110. In one embodiment, the wireless devices 106-110 may be utilized to give ratings or comments regarding specific portions of media content, such as flagging portions of a debate that the user likes or dislikes during the actual debate.

In one embodiment, the interactive content communicated to the wireless devices 106-110 through the set-top box 102 may be utilized to encourage an individual or team competition between the users of the wireless devices 106-110. For example, the users may play along to a game of Jeopardy, who wants to be a millionaire, the price is right, or wheel of Fortune utilizing the interactive content sent to each of the wireless devices 106-110.

In another embodiment, the users may utilize gaming options to choose an adventure where each user may activate their mobile device and join in at the point in the story that is displayed on the television 104. The users may then follow along their own paths in the story line. Users may join in and take control of customizations that may happen on the set-top box 102. Each user may be able to switch out the content on the respective screens of the wireless devices 106-110. In one embodiment, the content may be recorded to the DVR to create a unique video based on customizations made in real-time. Users may replays sports on content that is being sent from the set-top box 102, this functionality may allow the wireless devices 106-110 to follow the licensing and syndication rules required for the set-top box and not those of the Internet. The wireless devices 102 connected to the set-top box 102 as an IPTV box may be known to a local communications service provider and as a result may have permission and access to the content delivered to the set-top box 102 without additional licenses or requirements. In one embodiment, each of the wireless devices may double as a Wi-Fi based game controller where the set-top box 102 is the game controller. Each of the wireless devices 106-110 may run a mobile application that shares the phone statistics, such as accelerometer feedback.

In one embodiment, the bandwidth utilized by the wireless devices 106-110 comes through the set-top box 102 and the corresponding data connection. As a result, wireless costs for each of the wireless devices 106-110 may be reduced significantly. For example, bandwidth usage for a communication service provider associated with the wireless device 108 may be reduced by utilizing a Wi-Fi connection with the set-top box 102.

Figure 2:
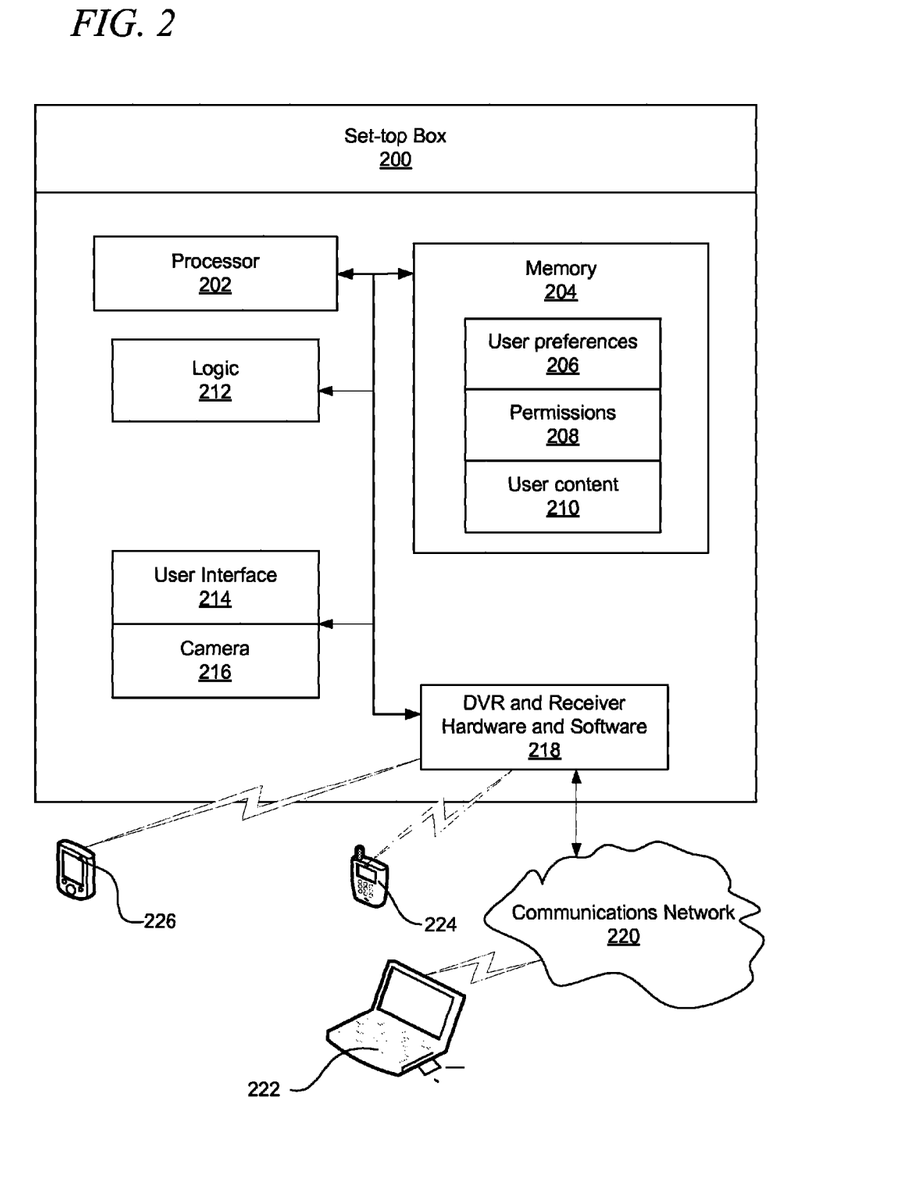
FIG. 2 is a block diagram of a set-top box in accordance with an illustrative embodiment.

FIG. 2 is a block diagram of a set-top box in accordance with an illustrative embodiment. In one embodiment, the set-top box 200 may include a processor 202, memory 204, user preferences 206, permissions 208, content 210, logic 212, user interface 214, camera 216, and DVR and receiver hardware and software 220. The set-top box 200 may communicate with communications network 220, and wireless devices 222, 224, and 226.

The processor 202 is circuitry or logic enabled to control execution of a set of instructions, application, operating system, kernel, or program. The processor 202 may be a microprocessor, digital signal processor, central processing unit, or other device suitable for controlling an electronic device including one or more hardware and software elements, executing software, instructions, programs, and applications, converting and processing signals and information, and performing other related tasks. The processor 202 may be a single chip (e.g. ASIC, FPGA, microprocessor, etc.) or integrated with other computing or communications elements.

The memory 204 is a hardware element, device, or recording media configured to store data for subsequent retrieval or access at a later time. The memory 204 may be static or dynamic memory 204. The memory 204 may include a hard disk, random access memory, cache, removable media drive, mass storage, or configuration suitable as storage for data, instructions, and information. In one embodiment, the memory 204 and processor 202 may be integrated. The memory 204 may use any type of volatile or non-volatile storage techniques and mediums.

In one embodiment, the memory 204 may store interactive content. The memory 204 may also store hyperlinks or other references to interactive content that are accessible by communications received by the set-top box 200.

The memory 204 may also store interactive content associated with media content recorded on the set-top box or digital video recorder (DVR). In one embodiment, the memory 204 is integrated with the DVR and receiver hardware and software 220. The memory 204 may be partitioned for utilization by the DVR and receiver hardware and software 220 as well as other components of the set-top box 200. The set-top box 200 may include any number of computing and telecommunications components not specifically described herein for purposes of simplicity, such devices or elements may include busses, motherboards, circuits, ports, interfaces, cards, converters, adapters, connections, transceivers, displays, antennas, and other similar components.

In one embodiment, the user preferences 206 are settings, criteria, and parameters for controlling the media and communications features of the set-top box 200. In one embodiment, the user preferences may control registering devices/user to receive interactive content content based on feedback and selections by a user. The user preferences 206 may also include one or more names for a network distributed by the set-top box. For example, the set-top box 200 may activate router that communicates utilizing one or more Wi-Fi names that may be utilized by the wireless devices 224, 226, and 228. In one embodiment, the user preferences 206 may store a number of different user profiles associated with a number of users or the wireless devices 224, 226, and 228. The user preferences 206 may store hardware identifiers, software identifiers, nicknames, contact lists, preferred social networking sites and access information including usernames and passwords, and other similar details, information and settings.

In one embodiment, the permissions 208 are the parameters that locally govern the management and utilization of interactive content. For example, the permissions 208 may establish types of content, rating preferences for content distributed through the set-top box 200, as well as other allowed or prohibited content. In on embodiment, a number of users may utilize the set-top box 200 and as a result the permissions 208 may set limits and parameters that locally govern utilization of the set-top box 200. For example, the permissions 208 may establish rating levels associated with media content that users of the set-top box 200 may store and communicate to the wireless devices 224, 226, and 228. The permissions 208 may also set times of day that the interactive content may be shared, such as between 8:00 a.m. and 8:00 p.m.

The user content 210 may store content generated by the user or the wireless devices 224, 226, and 228. For example, as the users viewed media content, the users may view various different forms of interactive content. The retrieved user content 210 may be stored temporarily in the user content 210 in the event that any of the other wireless devices 224, 226, and 228 the corresponding interactive content. As a result, the bandwidth utilized by the set-top box 200 is reduced, the time required to retrieve interactive content in reduced, and bandwidth is conserved. The user content 210 may also store preferences governing utilization of retrieve or user generated content. In one embodiment, interactive content may be associated with a user response that may also respond to the media content. For example, while watching a sporting event, a user may utilize the wireless device 226 to post a video, audio, or text comment associated with that portion of the media content that may be subsequently distributed through the set-top box 200 to one or more social networks. For example, the user may encourage a party watching the media content subsequently to review a particular deleted scene or look at a particular website before continuing. The user content 210 that is generated from the wireless devices 224, 226, and 228 may be saved strictly to the set-top box 200 or may be saved to remote devices or networks, such as a social network, cloud file services, or so forth. The interactive content may be saved in the user content 210 or saved as a link accessible from one or more other set-top boxes or through other networks.

The user interface 214 is an audio, visual, or tactile interface for displaying images, data, text, and information to a user. The user interface 214 may generate a graphical user interface for communication to one or more interconnected displays or the wireless devices 224, 226, and 228.

The user interface 214 may also be any number of buttons, scroll wheels, screens, touch interfaces, or other elements for receiving and outputting information to a user. In one embodiment, the user interface 214 may provide an interface for receiving input from a remote control, such as a Bluetooth or infrared remote control. The user interface 214 may also include a keyboard, a touch screen, a Braille interface, speakers, a microphone, and other similar input and output devices. The wireless devices 224, 226, and 228 may also interact directly with the user interface 214 for receiving input and displaying information.

The camera 216 is an image capture device. The images may include still and video images that may be retrieved and stored in the memory 204 or communicated directly to one or more other users. In one embodiment, the camera 216 may be integrated with the set-top box 200. In another embodiment, the camera may be externally linked utilizing any number of wireless or wired connections, such as a high definition media interface (HDMI), USB, Bluetooth, or Wi-Fi connection. In particular, the camera 216 may capture the user content 210 for storage. For example, the users of the set-top box 200 may record their reaction to a particular portion of media content. The camera 216 may also be representative of the cameras of the wireless devices 224, 226, and 228 that may transmit content to the set-top box 200. For example, the set-top box 200 may act as a videoconference router with images, audio, video, text input or a combination thereof communicated from and received by the set-top box 200.

The digital video recorder and receiver hardware and software 220 are the hardware and software elements that allow the set-top box to function as a DVR and as a receiver. In one embodiment, the DVR and receiver hardware and software 220 may include logical elements for converting signals into media content and interactive content that may be displayed to the television or other display. The DVR and receiver hardware and software 220 may also incorporate network interface elements for communicating with the communications network 222 which may include a satellite, cable, DSL, IPTV, or other networks. For example, the incoming content may be decoded and reformatted for display on a high-definition television or on the wireless devices 224, 226, and 228. For example, the DVR and receiver hardware and software 220 may format the satellite signals for display to the user and similarly, may function to display a message icon at the same time the standard content is displayed to the user.

Figure 3:
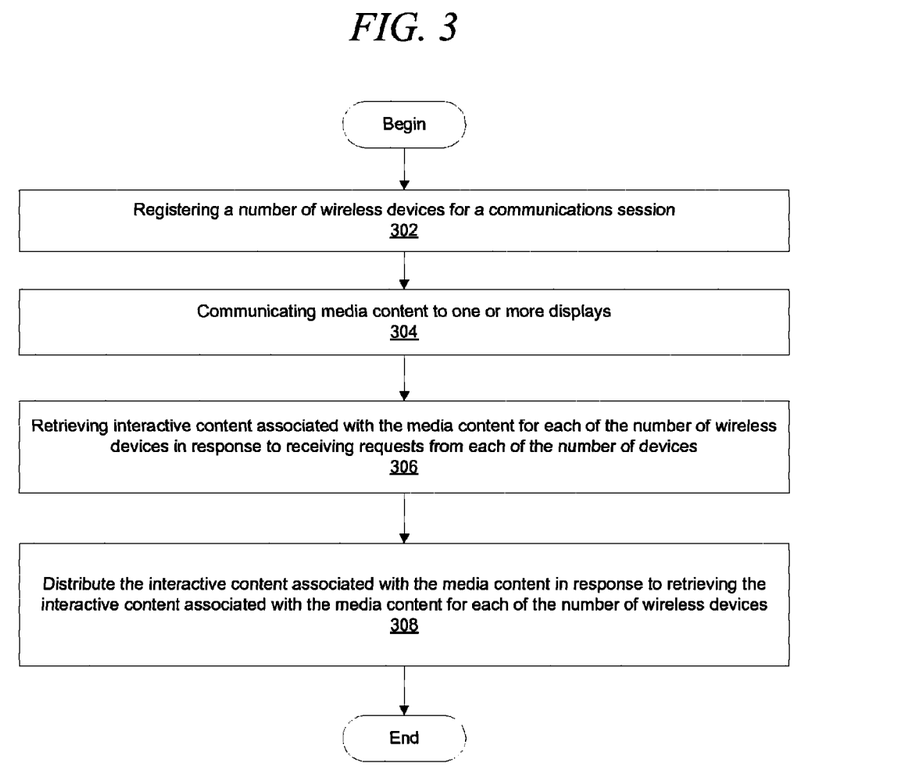
FIG. 3 is a flowchart of a process for distributing content from a set-top box in accordance with an illustrative embodiment.

FIG. 3 is a flowchart of a process for distributing content from a set-top box in accordance with an illustrative embodiment. The process may be implemented by a set-top box as is herein described. In one embodiment, the set-top box is configured to communicate IPTV and other interactive content for display by one or more televisions, displays, and connected wireless devices. The set-top box may have a hard wired or wireless connection to an Internet connection through one or more networks, connections, devices, or systems.

In one embodiment, the process may begin with the set-top box registering a number of wireless devices for a communication session (step 302). The set-top box may register the wireless devices utilizing partway identifiers, such as MAC addresses, IMEIs, or software identifiers, such as IP addresses, user names, passwords, account numbers, nicknames, software keys, or so forth. In one embodiment, the registration may be a permanent registration for any communication sessions when the wireless device is in proximity to the set-top box. In another embodiment, the registration may be temporary for that communication session. For example, a registration invitation may be sent from the set-top box utilizing a graphical user interface and/or the remote control or from a wireless device associated with a master user of the set-top box.

Next, the set-top box communicates media content to one or more displays (step 304). The displays may include one or more televisions, monitors, projectors, or other devices configured to display the media content. In one embodiment, the media content may also be streamed from the set-top box to each of the number of wireless devices as part of the communication session. The streaming may be activated or deactivated by each individual user of the wireless devices to reduce bandwidth utilization and to preserve battery life. In one embodiment, the playback of the media content may be synchronized between the one or more displays and the one or more wireless devices when displaying the same media content. For example, if there is a one second delay in displaying the media content to the wireless devices, the set-top box may buffer or to the media content errors as received with a one second delay to synchronize playback between the displays and the wireless devices.

Next, the set-top box retrieves interactive content associated with the media content for each of the number of wireless devices in response to receiving requests from each of the number of devices (step 306). In one embodiment, the interactive content may be stored remotely for access by the set-top box. For example, the set-top box may receive the interactive content from one or more servers or databases of a communications service provider or an affiliated party. As a result, the bandwidth of the connection or service to the set-top box may be preserved because only requested interactive content is downloaded to the set-top box for distribution. In one embodiment, if one of the wireless devices receives selected interactive content, the interactive content is stored in case any of the other wireless devices make similar requests thereby increasing communication speeds and reducing the bandwidth utilized by the set-top box. The interactive content may be focused on the media content, advertisements, tickers, news information, infomercials, information or data related to all aspects of the media content, and other commercially created or user created content.

In another embodiment, the interactive content may be retrieved and stored by the set-top box. The interactive content may then be accessed and parsed to each of the wireless devices based on individual requests. Bandwidth between the set-top box and wireless devices may be conserved because communications of the interactive content occur only based on individual user requests.

Next, the set-top box distributes the interactive content associated with the media content in response to retrieving the interactive content associated with the media content for each of the number of wireless devices (step 308). In one embodiment, the set-top box may distribute the interactive content as it is streamed to the set-top box. In another embodiment, the set-top box may ensure that all of the interactive content is received and/or verified before communicating the interactive content to each of the requesting wireless devices. The interactive content may include web pages, application information, text, data, messages, alerts, video, images, streaming content, hyperlinks, documents, files, or other communicable content.

Figure 4:
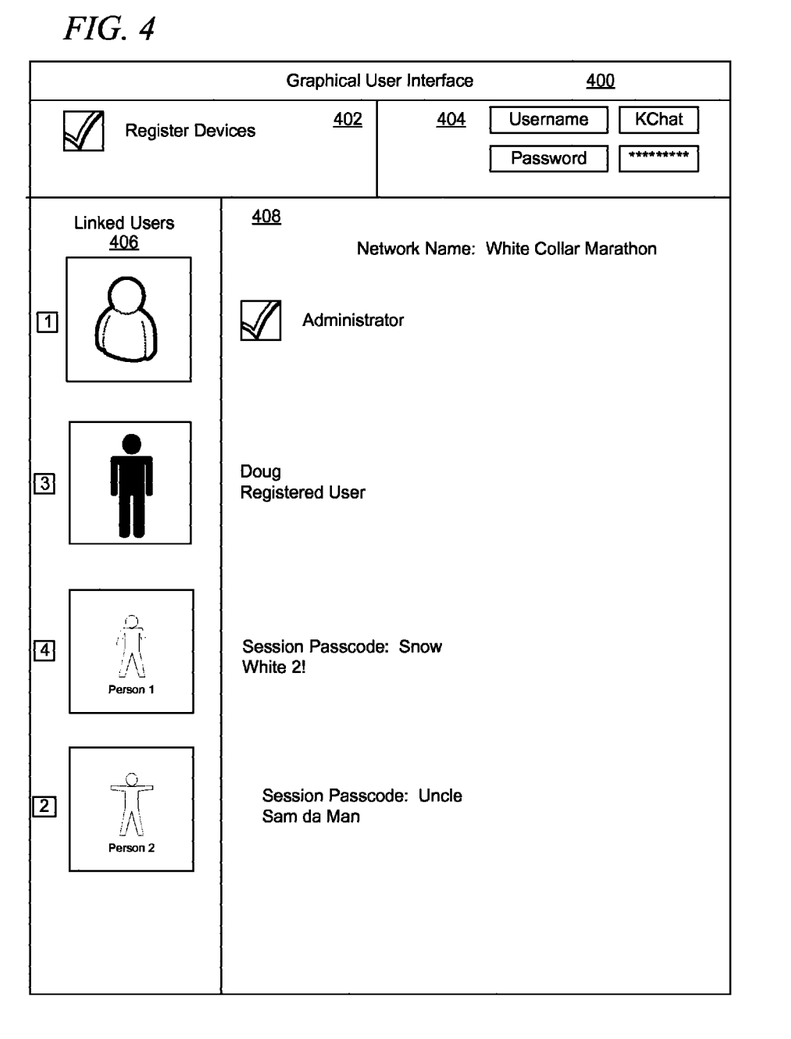
FIG. 4 is a pictorial representation of a graphical user interface displayed by the set-top box in accordance with an illustrative embodiment.

FIG. 4 is a pictorial representation of a graphical user interface 400 displayed by the set-top box in accordance with an illustrative embodiment. The graphical user interface 400 may be utilized to configure functionality of the set-top box. In one embodiment, the graphical user interface 400 may include any number of segments, partitions, windows, or display portions. For example, the graphical user interface 400 may include sections 402, 404, 406, and 408. In one embodiment, the graphical user interface 400 may be displayed to an administrator, master user, or other user with permission or authorization to configure the set-top box.

Figure 5:
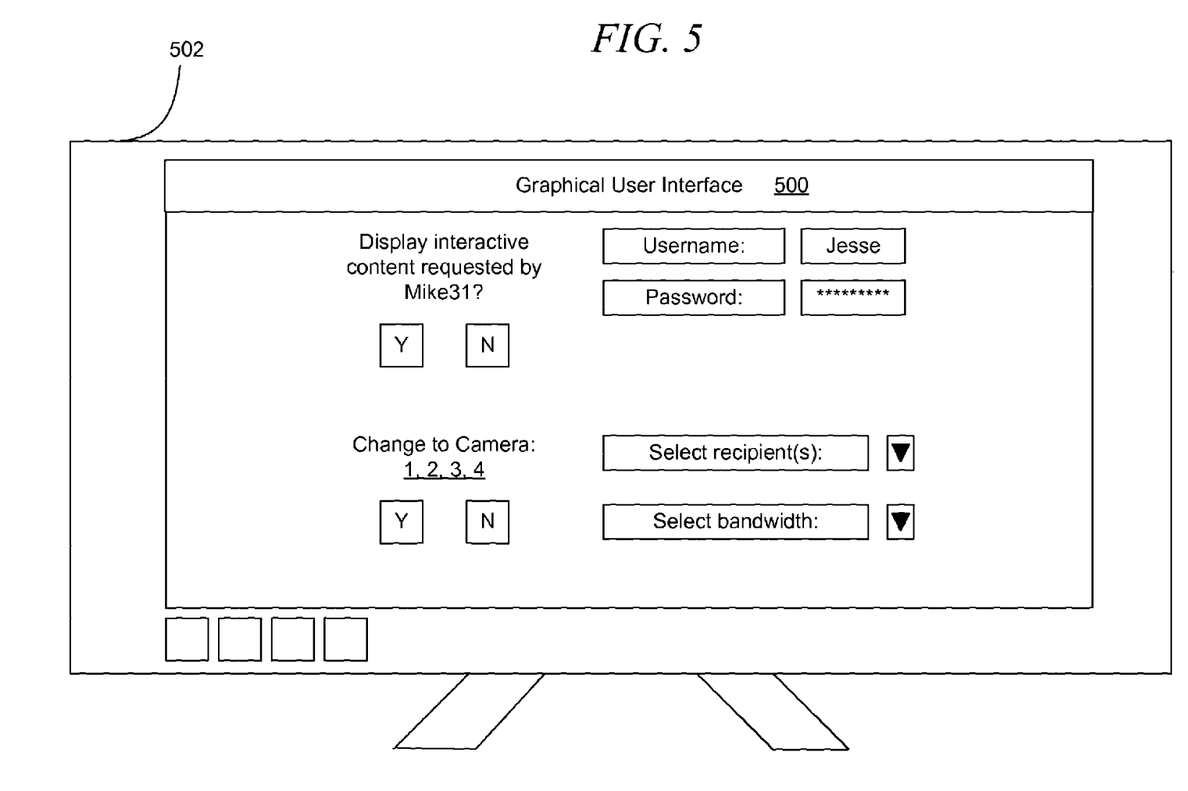
FIG. 5 is a pictorial representation of a graphical user interface displayed by a television in communication with a set-top box in accordance with an illustrative embodiment.

FIG. 5 is a pictorial representation of a graphical user interface 500 displayed by a television 502 in communication with a set-top box in accordance with an illustrative embodiment. In one embodiment, the graphical user interface 500 may be displayed to the television 502 for providing information, data, text, video, interactive content, and other media content. The graphical user interface 500 may also be configured to receive user preferences, permissions, and other settings for operating the set-top box.

In one embodiment, the graphical user interface 500 may be controlled by an administrator or master user. The administrator may also grant, cede, or partition control to all or portions of the television 502 or graphical user interface 500. For example, the graphical user interface 500 may be partitioned into different sections for displaying the original media content as well as interactive content selected by each of the users authorized to access the set-top box. In one embodiment, the users are directly connected to the set-top box utilizing any number of electronic devices. In another embodiment, the users may be remotely located from the set-top box and may still be permitted to interact through the graphical user interface 500 that may be broadcast to their location utilizing a server client relationship, with the set-top box acting as the server and their electronic device acting as the client.

The graphical user interface 500 may also be configured to allow each of the users to automatically display interactive content or to display interactive content in response to an affirmative user selection. The graphical user interface 500 may also be utilized to change camera angles for the media content, view replays, purchase products, research questions, or so forth.

The graphical user interface 500 may also be utilized to select users or recipients, manage bandwidth from the set-top box and to the set-top box, and otherwise configure the various settings.

The previous detailed description is of a small number of embodiments for implementing the invention and is not intended to be limiting in scope. The following claims set forth a number of the embodiments of the invention disclosed with greater particularity.

What is claimed:

1. A method for distributing content through a set-top box, the method comprising:
    registering a plurality of wireless devices for a communication session with the set-top box;
    communicating media content to one or more displays;
    capturing images of at least one user associated with at least one of the plurality of wireless devices and at least a portion of surroundings of the at least one user;
    receiving comments and drawings on at least one of the plurality of wireless devices;
    filtering and inserting, into the media content for each of the plurality of wireless devices, the captured images of the at least one user, the at least a portion of surroundings of the at least one user, and the comments and the drawings received on the at least one of the plurality of wireless devices;
    retrieving interactive content associated with the media content for each of the plurality of wireless devices in response to receiving requests from each of the plurality of wireless devices, the retrieved interactive content comprising at least one of interactive information regarding clothing worn by characters in the media content, interactive purchase information for products associated with the media content, interactive information regarding locations associated with the media content, interactive information regarding costs associated with aspects of the media content, additional interactive information about the media content, interactive bloopers associated with the media content, interactive information regarding cast or crew associated with the media content, interactive information regarding alternative endings for the media content, interactive information explaining aspects of the media content, interactive information including replays of the media content, or interactive information regarding social media content associated with the media content; and
    distributing the interactive content to each of the plurality of wireless devices in response to retrieving the interactive content for each of the plurality of wireless devices.

2. The method according to claim 1, further comprising:
    displaying interactive content available to each of the plurality of wireless devices for receiving the requests.

3. The method according to claim 2, wherein the interactive content includes different camera angles selected by a user of one of the plurality of wireless devices.

4. The method according to claim 1, further comprising:
    distributing the media content to the plurality of wireless devices, wherein playback of the media content is synchronized between the set-top box and each of the plurality of wireless devices.

5. The method according to claim 1, further comprising:
    displaying the interactive content selected from each of the plurality of wireless devices to the one or more displays.

6. The method according to claim 5, wherein the displaying is performed in response to a user selection and user preferences for the set-top box.

7. The method according to claim 1, wherein the media content and the interactive content is licensed for each of the plurality of wireless devices communicating with the set-top box.

8. The method according to claim 1, wherein the set-top box is a device configured for Internet Protocol television streaming.

9. The method according to claim 5, wherein the comments and the drawings received on each of the plurality of wireless devices are displayed on the one or more displays.

10. The method according to claim 1, wherein an identification of the media content, an identification of the interactive content, and an identification of each of the plurality of wireless devices is communicated to at least a provider providing the media content.

11. A set-top box, comprising:
    an interface for communication with a communications network and a plurality of wireless devices registered with the set-top box for a communications session;
    output ports for communicating media content to one or more displays;
    one or more cameras for capturing images of at least one user associated with at least one of the plurality of wireless devices and at least a portion of surroundings of the at least one user;
    logic that:

filters and inserts, into the media content for each of the plurality of wireless devices, the captured images of the at least one user, the at least a portion of surroundings of the at least one user, and comments and drawings received on at least one of the plurality of wireless device; and retrieves interactive content associated with the media content through the communications network for each of the plurality of wireless devices in response to receiving requests from each of the plurality of wireless devices, the retrieved interactive content comprising at least one of interactive information regarding clothing worn by characters in the media content, interactive purchase information for products associated with the media content, interactive information regarding locations associated with the media content, interactive information regarding costs associated with aspects of the media content, additional interactive information about the media content, interactive bloopers associated with the media content, interactive information regarding cast or crew associated with the media content, interactive information regarding alternative endings for the media content, interactive information explaining aspects of the media content, interactive information including replays of the media content, or interactive information regarding social media content associated with the media content; and a memory that stores media content and interactive content selected by the plurality of wireless devices.

12. The set-top box according to claim 11, wherein the logic synchronizes playback of the media content on the one or more displays and the plurality of wireless devices.

13. The set-top box according to claim 11, wherein the logic partitions portions of the one or more displays for displaying the interactive content selected by one or more of the plurality of wireless devices.

14. The set-top box according to claim 11, wherein an identification of the media content, an identification of the interactive content, and an identification of each of the plurality of wireless devices is communicated to at least a provider providing the media content.

15. The set-top box according to claim 11, wherein the comments and the drawings received on each of the plurality of wireless devices are displayed on the one or more displays.

16. A set-top box, comprising:
a processor that executes a set of instructions; and
a memory that stores the set of instructions, wherein the set of instructions, when executed by the processor, causes the set-top box to:
register a plurality of wireless devices for a communication session;
communicate media content to one or more displays;
capture images of at least one user associated with at least one of the plurality of wireless devices and at least a portion of surroundings of the at least one user;
filter and insert, into the media content for each of the plurality of wireless devices, the captured images of the at least one user, the at least a portion of surroundings of the at least one user, and comments and drawings received on at least one of the plurality of wireless devices;
retrieve interactive content associated with the media content for each of the plurality of wireless devices in response to receiving requests from each of the plurality of wireless devices, the retrieved interactive content comprising at least one of interactive information regarding clothing worn by characters in the media content, interactive purchase information for products associated with the media content, interactive information regarding locations associated with the media content, interactive information regarding costs associated with aspects of the media content, additional interactive information about the media content, interactive bloopers associated with the media content, interactive information regarding cast or crew associated with the media content, interactive information regarding alternative endings for the media content, interactive information explaining aspects of the media content, interactive information including replays of the media content, or interactive information regarding social media content associated with the media content; and
distribute the interactive content to each of the plurality of wireless devices in response to retrieving the interactive content for each of the plurality of wireless devices.

17. The set-top box according to claim 16, wherein the set-top box is configured as a wireless router for the plurality of wireless devices.

18. The set-top box according to claim 16, wherein the playback of the media content is synchronized between the set-top box and the wireless devices.

19. The set-top box according to claim 16, wherein the interactive content selected by one of the plurality of wireless devices is stored by the memory for retrieval in response to a selection of another of the plurality of wireless devices.

20. The set-top box according to claim 16, wherein the comments and the drawings received on each of the plurality of wireless devices are displayed on the one or more displays, and wherein an identification of the media content, an identification of the interactive content, and an identification of each of the plurality of wireless devices is communicated to at least a provider providing the media content.

* * * * *